US010918956B2

(12) United States Patent
Rout et al.

(10) Patent No.: US 10,918,956 B2
(45) Date of Patent: Feb. 16, 2021

(54) SYSTEM FOR MONITORING ONLINE GAMING ACTIVITY

(71) Applicants: Kelli Rout, Webster City, IA (US); Kim Rout, Webster City, IA (US); Kamryn Rout, Webster City, IA (US)

(72) Inventors: Kelli Rout, Webster City, IA (US); Kim Rout, Webster City, IA (US); Kamryn Rout, Webster City, IA (US)

(*) Notice: Subject to any disclaimer, the term of this patent is extended or adjusted under 35 U.S.C. 154(b) by 119 days.

(21) Appl. No.: 16/365,897

(22) Filed: Mar. 27, 2019

(65) Prior Publication Data
US 2019/0299104 A1 Oct. 3, 2019

Related U.S. Application Data

(60) Provisional application No. 62/650,807, filed on Mar. 30, 2018.

(51) Int. Cl.
A63F 13/79 (2014.01)
A63F 13/215 (2014.01)
A63F 13/98 (2014.01)
A63F 13/24 (2014.01)
A63F 13/23 (2014.01)
A63F 13/87 (2014.01)
A63F 13/245 (2014.01)

(52) U.S. Cl.
CPC ............ A63F 13/79 (2014.09); A63F 13/215 (2014.09); A63F 13/23 (2014.09); A63F 13/24 (2014.09); A63F 13/87 (2014.09); A63F 13/98 (2014.09); A63F 13/245 (2014.09)

(58) Field of Classification Search
CPC ........ A63F 13/215; A63F 13/79; A63F 13/98; A63F 13/23; A63F 13/24; A63F 13/87; A63F 13/245; A63F 2300/556
USPC ........................................................ 463/46
See application file for complete search history.

(56) References Cited

U.S. PATENT DOCUMENTS

| | | | | |
|---|---|---|---|---|
| 7,785,197 B2* | 8/2010 | Smith | ..................... | A63F 13/40 463/30 |
| 8,108,774 B2* | 1/2012 | Finn | ........................ | G06T 13/40 715/706 |
| 8,660,847 B2* | 2/2014 | Soemo | ..................... | G06F 3/167 704/251 |
| 8,870,654 B2* | 10/2014 | Nakayama | .............. | A63F 13/02 463/38 |
| 8,956,234 B2* | 2/2015 | Wolff-Petersen | ....... | G06F 3/023 463/47 |

(Continued)

Primary Examiner — William H McCulloch, Jr.

(57) ABSTRACT

A system for monitoring online gaming activity. The system primarily comprises of a controller extension unit, web server, a listening device and a software application designed to provide an interface for parents or guardians to review captured audio data of in-game oral communication. The controller extension unit is designed to capture audio data and to transmit the captured audio data to the web server where it can be processed and stored. The listening device is designed to wirelessly stream in-game audio data in real-time through built-in speakers from any room in a house. The software application allows parents or guardians to belatedly review in-game audio data at their convenience. The software further includes a customizable keyword detection and notification feature to allow parents or guardians to prioritize the language that they are most concerned by and wish to discourage.

20 Claims, 9 Drawing Sheets

(56) References Cited

U.S. PATENT DOCUMENTS

| | | | |
|---|---|---|---|
| 9,044,683 B2* | 6/2015 | Rom | A63F 13/25 |
| 9,327,193 B2* | 5/2016 | Tom | H04L 47/76 |
| 9,480,911 B2* | 11/2016 | Rom | A63F 13/213 |
| 10,179,291 B2* | 1/2019 | Thomas | A63F 13/87 |
| 10,311,857 B2* | 6/2019 | Kepner | A63F 13/533 |
| 10,617,938 B2* | 4/2020 | Chen | A63F 13/60 |
| 2008/0294439 A1* | 11/2008 | Kirby | G10L 15/26 |
| | | | 704/251 |
| 2010/0174813 A1* | 7/2010 | Hildreth | H04L 51/34 |
| | | | 709/224 |
| 2011/0191097 A1 | 8/2011 | Spears | |
| 2011/0307434 A1 | 12/2011 | Rostampour et al. | |
| 2013/0060571 A1* | 3/2013 | Soemo | G06F 3/011 |
| | | | 704/251 |
| 2014/0074842 A1* | 3/2014 | Tal | G06Q 10/107 |
| | | | 707/737 |
| 2015/0238863 A1* | 8/2015 | Rom | A63F 13/23 |
| | | | 463/31 |
| 2018/0166065 A1* | 6/2018 | Kepner | A63F 13/87 |
| 2018/0345152 A1* | 12/2018 | Duan | G06F 16/7867 |
| 2019/0299104 A1* | 10/2019 | Rout | G10L 15/26 |
| 2020/0054940 A1* | 2/2020 | Andall | A63F 13/424 |

* cited by examiner

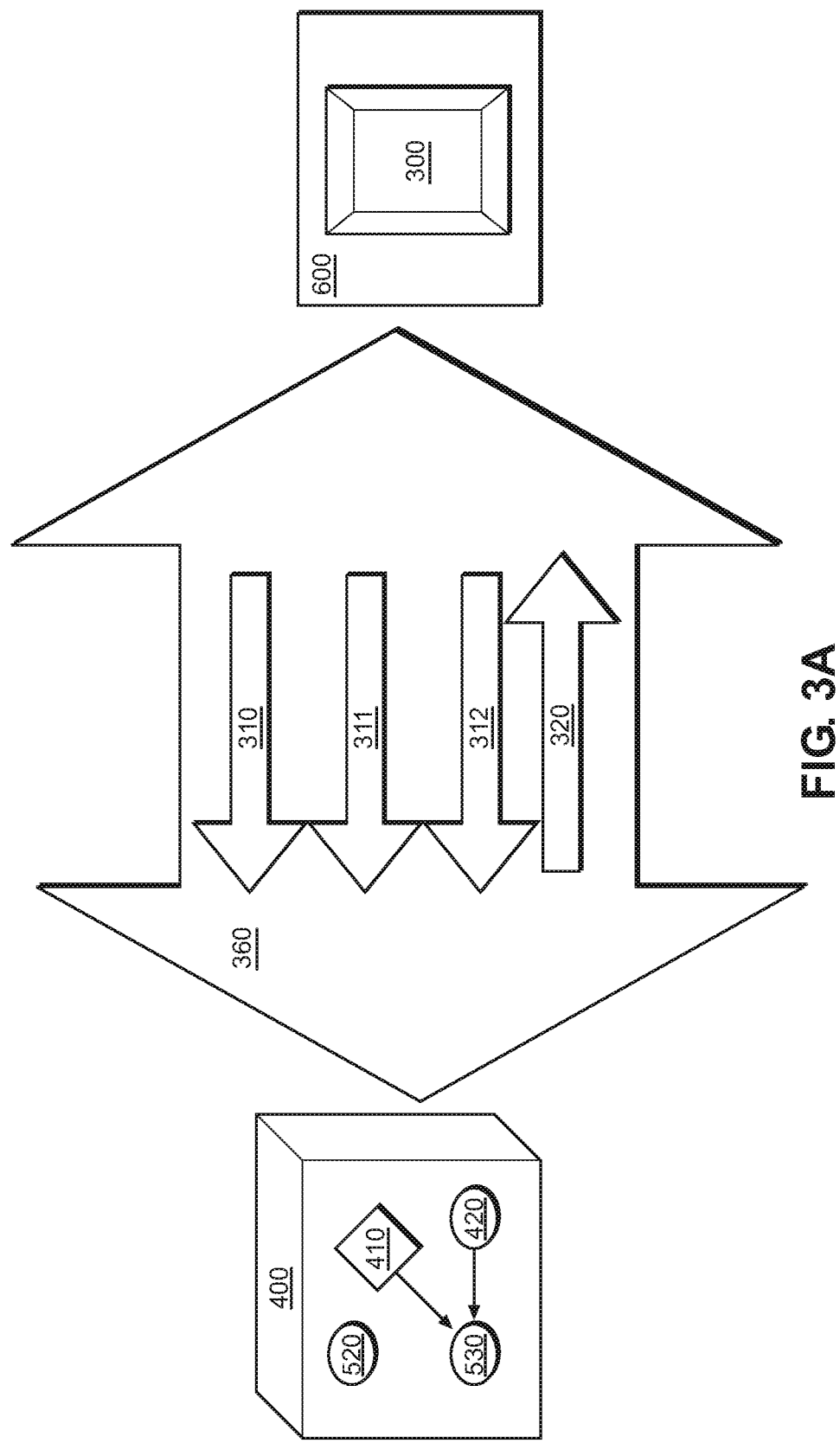

SYSTEM FOR MONITORING ONLINE GAMING ACTIVITY

CROSS REFERENCE TO RELATED APPLICATION

This application claims the benefit of U.S. Provisional Application No. 62/650,807 filed om Mar. 30, 2018. The above identified patent application is herein incorporated by reference in its entirety to provide continuity of disclosure.

BACKGROUND OF THE INVENTION

The present invention relates to online gaming. More specifically, the present invention provides a means for parents to monitor oral and text-based dialogue occurring between their children and other players connected via online gaming.

Video games over the past few decades have enjoyed tremendous popularity among children, and young adults. The advent of online gaming introduced an entirety new way for players to experience video games by making it possible for groups of players to connect and interact virtually despite being geographically separate in reality. As video games remain popular among children and young adults, parents now struggle to monitor and control their children's interactions with others. Many parents worry that without proper supervision their young children will be prematurely exposed to profane language or inappropriate subject matter, and that their children may be victimized or otherwise negatively influenced by other players in the game. Additionally, parents worry that their unsupervised children will unintentionally disclose closely held private information that can lead to identity theft.

The present invention provides a means for parents to regain a portion of control over the in-game interactions that their children have with other players.

Devices have been disclosed in the known art that relate to the monitoring of online gaming activity. These include devices that have been patented and p fished in patent application publications. These devices generally relate to computer implemented systems for monitoring electronic communications. However, none of these devices include a controller extension unit in conjunction with a listening device and downloadable software application designed to allow parents or guardians to monitor in-game communications in real-time, or to send customized notifications based on user defined and weighted keywords.

In light of the devices disclosed in the known art, it is submitted that the present invention substantially diverges in design elements from the known art and consequently it is clear that there is a need in the art for an improvement to existing electronic communication monitoring devices. In this regard the instant invention substantially fulfills these needs.

SUMMARY OF THE INVENTION

In view of the foregoing disadvantages inherent in the known types of in-game communication monitoring systems now present in the known art, the present invention provides a new in-game communication monitoring system wherein the same can be utilized for providing convenience for the user when parents wish to proactively monitor the in-game communications between their children and other players.

It is therefore an object of the present invention to provide a new and improved game communication monitoring system that has all of the advantages of the known art and none of the disadvantages.

Another object of the present invention is to provide a controller extension unit including an electronic connector, a first power supply, a first transceiver, a first microphone, and a first microcontroller, wherein the controller extension unit is configured to be removably attached to an electronic port on a controller for a gaming console.

Yet another object of the present invention is to provide a first microphone configured to capture audio data from in-game oral communication between players on both ends of the conversation, a first microcontroller configured to record the audio data of in-game oral communication between players captured by the microphone, a first transceiver configured to transmit captured audio data recorded on the first microcontroller to a web-based data server, and a first power supply configured to supply electrical energy to the first transceiver, the first microphone, and the first microcontroller.

A further object of the present invention is to provide a web-based data server configured to store the captured audio data as an audio file, and to convert the audio file into a searchable text-based transcript of the in-game oral communication between players.

Another object of the present invention is to provide a listening device comprising a portable housing with a second power supply, a second transceiver, a second microphone, a second microcontroller, and a speaker disposed therein, such that the listening device is configured to allow parents or guardians to remotely monitor in-game oral communication between children in their care and other players;

Yet another object of the present invention is to provide a downloadable sot ware application configured to allow parents or guardians to receive notifications from and to interface with the web-based data server housing audio files and searchable text-based transcripts of the in-game oral communication between players.

An additional object of the present invention is to provide a controller extension unit further including a plurality of buttons configured to transmit control commands wirelessly, via the first transceiver, to the second microphone and speaker disposed on the listening device.

Another object of the present invention is to provide a monitoring system wherein the second microcontroller on the listening device is configured to implement control commands received via the second transceiver from the plurality of buttons disposed on the controller extension unit, such that the second microphone can be turned on or off, and the volume level of the speaker can be raised or lowered.

Still another object of the present invention is to provide a monitoring system wherein the speaker on the listening device is configured to stream audio data of in-game oral communication between players, via the second transceiver, in real-time.

Yet another object of the present invention is to provide a second microphone of the listening device configured to allow a parent or guardian to actively participate in the in-game oral communication between players.

A further object of the present invention is to provide a listening device configured to remotely monitor in-game oral communication up to the 30 feet away from the controller extension unit.

Yet another object of the present invention is to provide a controller extension unit further including a 3.5 mm audio jack configured to facilitate wired connection of an audio output device through the controller extension unit.

A further object of the present invention is to provide a second microphone of the listening device is configured to allow a parent or guardian to actively participate in the in-game oral communication between players.

Another object of the present invention is to provide a first microcontroller configured to continuously record captured audio data and the first transceiver is configured to continuously transmit captured audio data to the web-based data server during gameplay.

An additional object of the present invention is to provide a web-based data server configured to employ English speech recognition software to convert the audio into a searchable text-based transcript.

Still another object of the present invention is to provide a downloadable software application further configured to facilitate review of both the recorded audio file and the searchable text-based transcript of the in-game oral communication between players after the communication has occurred.

A further object of the present invention is to provide a downloadable software application further configured to synch with in-game user accounts, such that a parent or guardian can perform in-game social activities like: viewing a friend list, adding or deleting friends, or viewing text messages, sending or deleting text messages.

Another object of the present invention is to provide a downloadable software application further configured to detect the usage of special keywords or phrases, via a keyword search of the searchable text-based transcript of in-game oral communication between players stored on the web-based data server.

Yet another object of the present invention is to provide a downloadable software application further configured to allow the parent or guardian to rank the special keywords or phrases by severity, and to customize the notification given for each keyword or phrase.

A further object of the present invention is to provide a monitoring system, wherein the first power supply of the controller extension unit and the second power supply of the listening device are wireless and rechargeable.

Another object of the present invention is to provide a monitoring system, wherein the second power supply of the listening device is wired.

Yet another object of the present invention is to provide an electronic connector disposed on the controller extension unit configured to be inserted into an audio output port on a controller for a gaming console, such that audio data from the other player participating in the in-game oral communication can be captured by the first microphone.

An additional object of the present invention is to provide a controller extension unit further including a second audio output port configured to facilitate wired connection of an audio output device through the controller extension unit.

Still another object of the present invention is to provide a monitoring system, wherein the first microcontroller is configured to continuously record captured audio data and the first transceiver s configured to continuously transmit captured audio data to the web-based data server during gameplay.

A further object of the present invention is to provide a monitoring system, wherein the audio captured data includes only the in-game oral communication and does not include sound effects from game play.

Another object of the present invention is to provide a system for monitoring online gaming activity that may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3A shows a flow chart of how a downloadable software application interfaces with a web-based data server in one embodiment of a system for monitoring online gaming activity.

DETAILED DESCRIPTION OF THE INVENTION

Figure 1A:
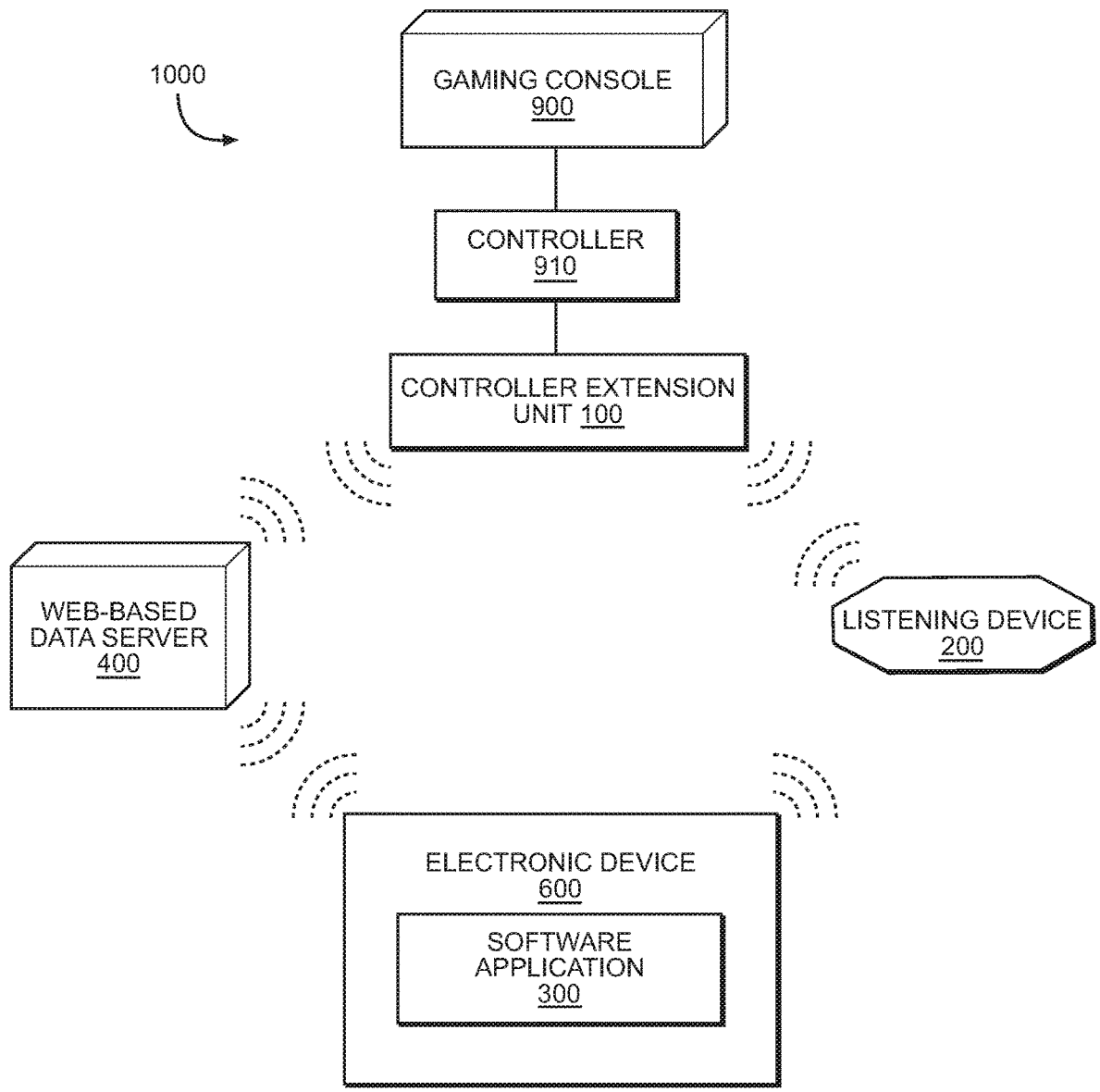
FIG. 1A shows a logical view of how the component parts of a system for monitoring online gaining activity interact with one another in one embodiment of a system for monitoring online gaming activity.

Reference is made herein to the attached drawings. Like reference numerals are used throughout the drawings to depict like or similar elements of the system for monitoring online gaming activities. For the purposes of presenting a brief and clear description of the present invention, the preferred embodiment will be discussed as used for a system for monitoring online gaming activities. The figures are intended for representative purposes only and should not be considered to be limiting in any respect.

Figure 1B:
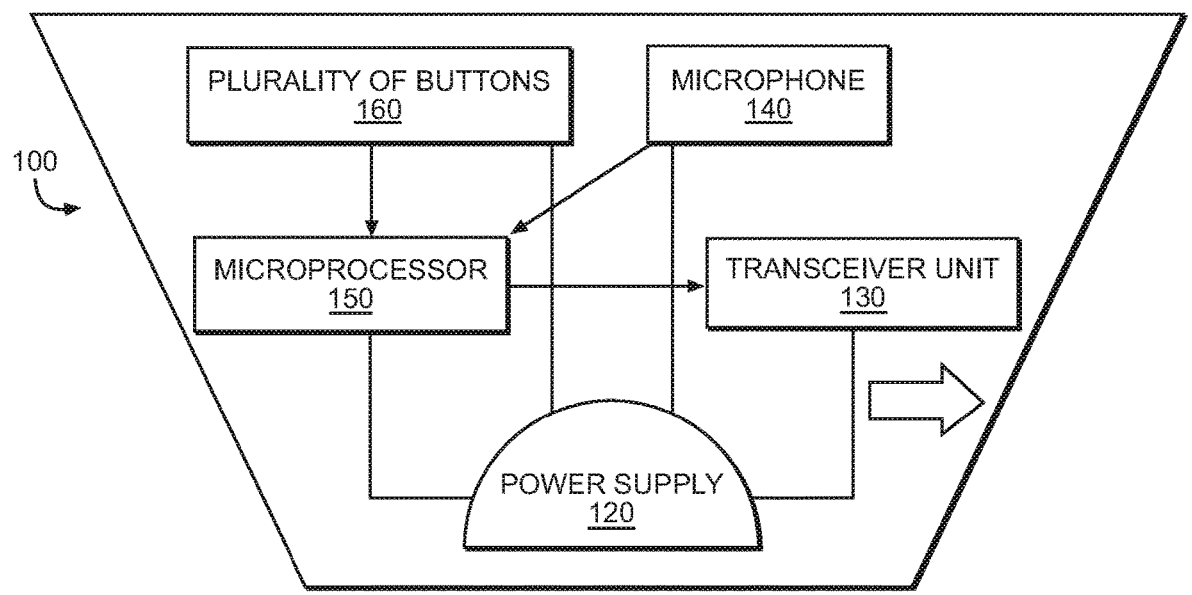
FIG. 1B shows a logical view of a controller extension unit and how the electrical components interact with one another in one embodiment of a system for monitoring online gaming activity.
Figure 1C:
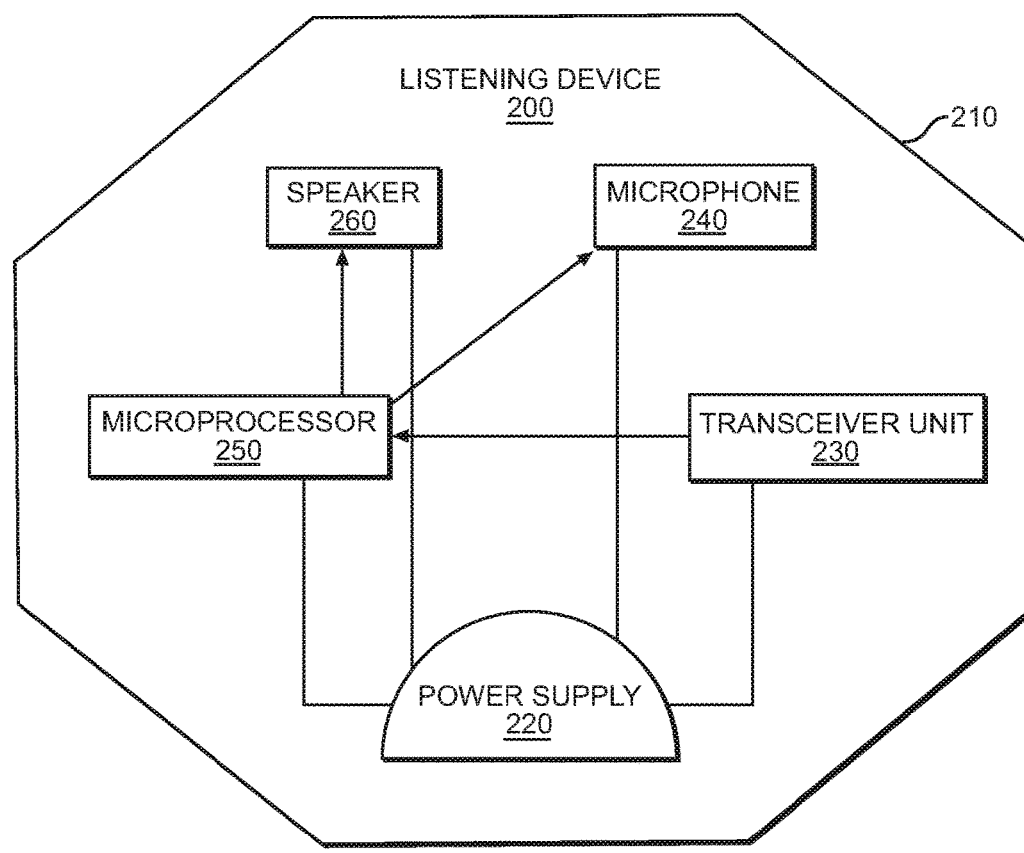
FIG. 1C shows a logical view of a listening device and how the electrical components interact with one another in an embodiment of a system for monitoring online gaming activity.

Referring now to FIGS. 1A, 1B, and 1C, there is shown a logical view of how the component parts of a system for monitoring online gaming activity interact with one another, a logical view of a controller extension unit and how the electrical components interact with one another in one embodiment of a system for monitoring online gaming activity, and a logical view of a listening device and how the electrical components interact with one another in an embodiment of a system for monitoring online gaming activity, respectively. The system for monitoring online gaming activities 1000, comprises a controller extension unit 100 operably connected to a game controller 910, which is in turn operably connected to a gaming console 900. "Gaming console" here is used to refer to any electronic device on which video games can be played. In the illustrated embodiment the controller extension unit 100 is configured to wirelessly communicate with a web-based data server 400 and a listening device 200. Additionally, a downloadable software application 300 that can be installed on any electronic device 600, like a phone or tablet, is also configured to wirelessly communicate with the web-based data server 400 and a listening device 200.

The controller extension unit 100 comprises a first power supply 120 configured to provide electrical energy to a first transceiver 130, a first microphone 140, and a first microcontroller 150. Furthermore, the first power supply 120 of the controller extension unit 100 is configured to be both wireless and rechargeable. The first microcontroller 150 is configured to record audio data captured via the first microphone 140, and to wirelessly transmit the captured audio data to the web-based data server 400. The controller extension unit 100 further includes a plurality of buttons 160 configured to transmit control commands wirelessly, via the first microcontroller 150 and the first transceiver 130, to the second microphone 240 and speaker 260 disposed on the listening device 200.

In the illustrated embodiment the listening device 200 comprises a portable housing 210 with a second power supply 220 configured to provide electrics energy to a second transceiver 230, a second microphone 240, a second microcontroller 250, and a speaker 260 disposed therein. Furthermore, the second power supply 220 of the listening device is configured to be both wireless and rechargeable. In other embodiments the second power supply 220 of the listening device 200 is configured to be wired. The second microcontroller 250 is configured to control the volume level speaker 260, to control whether, or not the second microphone 240 is actively receiving audio input, and to receive command signals from either the downloadable software application 300 or from the controller extension unit 100 via the second transceiver 230. Furthermore, the listening device 200 is configured to allow parents or guardians to remotely monitor in-game oral communication between children in their care and other players in the game.

Figure 2A:
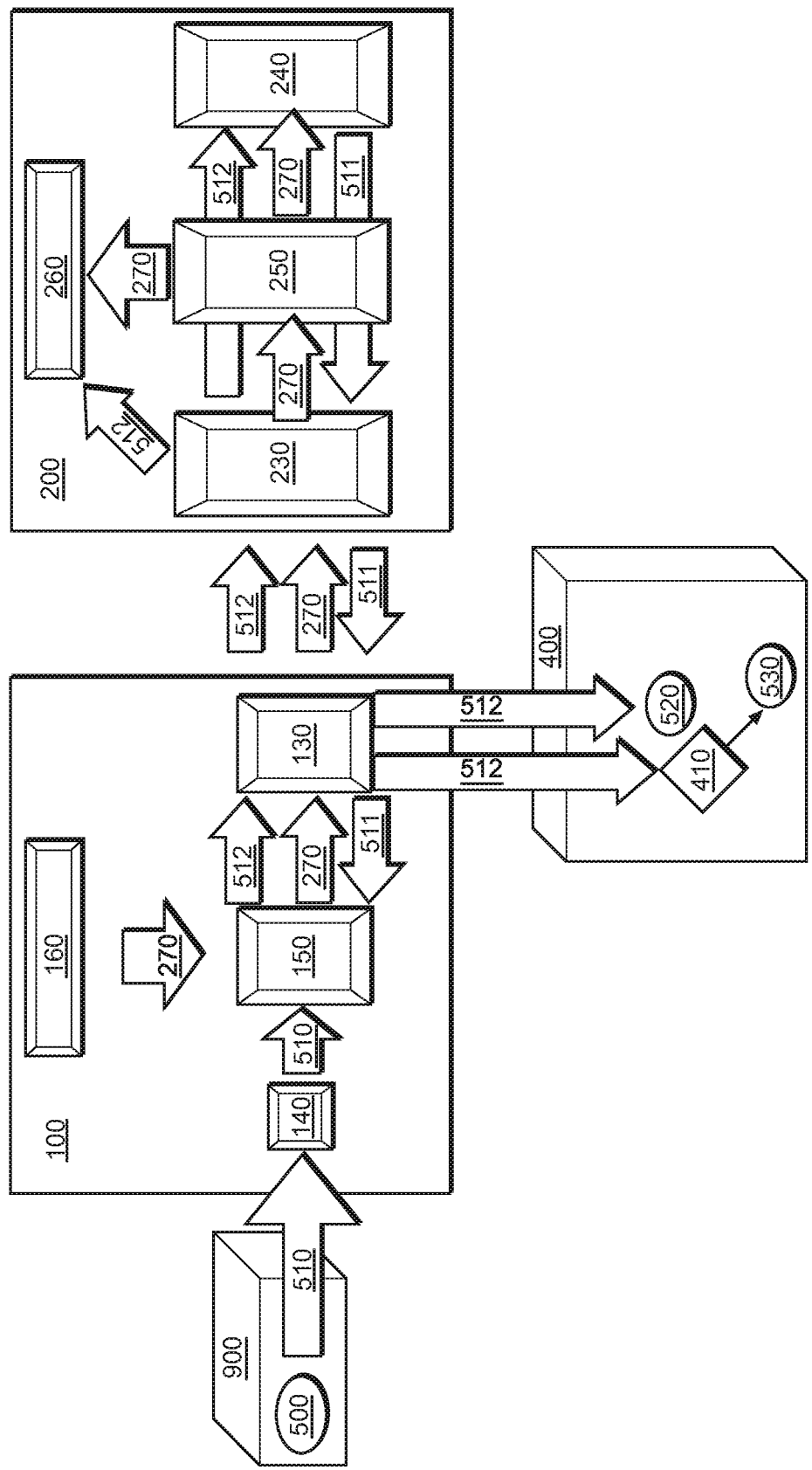
FIG. 2A shows a flow chart of how audio data and control commands are processed between a gaming console, a controller extension unit, a web-based data server, and a listening device is one embodiment of a system for monitoring online gaming activity.
Figure 2B:
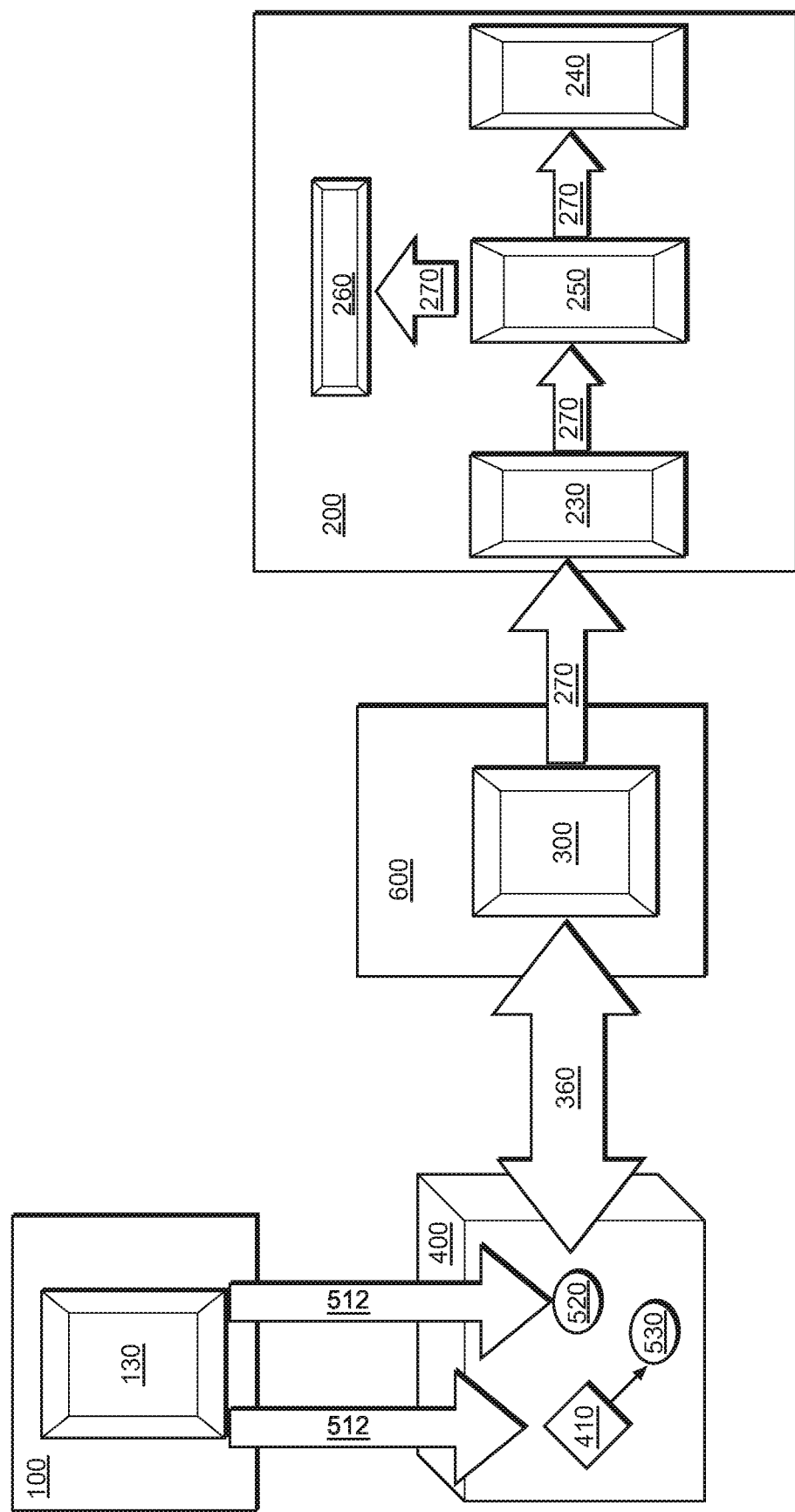
FIG. 2B shows a flow chart of how audio data and control commands are processed between a software, a controller extension unit, a web-based data server, and a listening device in one embodiment of a system for monitoring online gaming activity.

Referring now to FIGS. 2A and 2B, there is shown a flow chart of how audio data and control commands are processed between a gaming console, a controller extension unit, a web-based data server, and a listening device, and a flow chart of how audio data and control commands are processed between a software, a controller extension unit, a web-based data server, and a listening device in one embodiment of a system for monitoring online gamin activity, respectively.

In the illustrated embodiment, when an in-game oral communication 500 occurs through the gaming console 900, the first microphone 140 is configured to capture audio data 510 from in-game oral communication 500 between players on both ends of the conversation. Next the first microcontroller 150 is configured to process and record the audio data 510 of in-game oral communication 500 between players captured by the microphone and transmit the processed audio data 512 to the web based data server 400 through the first transceiver 130, which is configured to transmit the processed audio data 512 recorded on the first microcontroller 150 to a web-based data server 400. The processed audio data 512 comprises the originally captured audio data 510 combined with audio input from the second microphone 240. In some embodiments the processed audio data 512 can also filter out sound effects 540 from game play leaving only the voices from the in-game oral communication 500.

Once received, the web-based data server 400 employs a speech recognition software program 410 to convert the audio data 512 into a searchable text-based transcript 530. Additionally, the web-based data server 400 is configured to store the captured audio data 512 as an audio file 520, and to store the searchable text-based transcript 530 generated by the speech recognition software program 410. In this embodiment the speech recognition software 410 is configured to only recognize words spoken in English. However, in other embodiments the speech recognition software 410 can be configured to recognize words and phrases from other languages, for example Spanish or French, to expand the utility of the system to non-English speakers. In still other embodiments the first microcontroller 150 is configured to continuously record captured audio data 510 and the first transceiver 130 is configured to continuously transmit processed audio data 512 to the web-based data server 400, such that all communication during gameplay is captured and recorded for later review.

In the illustrated embodiment, the first microcontroller 150 is also configured to transmit command control signals 270 from the plurality of buttons 160 on the controller extension unit 100, such that the command control signals 270 are sent from the first transceiver 130 to the second transceiver 230, which is configured to receive the command control signals 270, and to send the command control signals 270 on to the second microcontroller 250. From there the second microcontroller 250 on the listening device 200 is configured to implement control commands 270, such that the second microphone 240 can be turned on or off, and the volume level of the speaker 260 can be raised or lowered. The second transceiver 230 is also configured to receive audio data 512 and to provide a livestream of the in-game oral communication 500 through the speaker 260 to a parent or guardian using the listening device 200 to remotely monitor the in-game activity of the child under their care. When the second microphone 240 is turned on, the second microphone 240 is configured to capture and retransmit the audio input from the monitoring parent or guardian, such that an additional piece of audio data 511 is sent back to the first microcontroller 150 via the second transceiver 230 which is also configured to transmit audio data 511 to the first transceiver 130. Wherein the first transceiver 130 is further configured to receive audio data 511 from the second transceiver 230, and to transmit the second piece of audio data 511 to the first microcontroller 150 where the additional piece of audio data 511 can be combined with the captured audio data 510 to create the processed audio data 512.

In FIG. 2B, a downloadable software application 300 is installed on an electrons device 600, like a phone or tablet, and is configured to allow parents or guardians to receive notifications from and to interact with the web-based data server 400 housing audio files 520 and searchable text-based transcripts 530 of the in-game oral communication 500 between players through a wireless interface 360. In one embodiment the downloadable software application 300 is further configured to transmit control commands to the listening device 200 such that the command control signals 270 are sent from the electronic device 600 to the second transceiver 230, which is configured to receive the command control signals 270, and to send the command control signals 270 on to the second microcontroller 250. From there the second microcontroller 250 on the listening device 200 is configured to implement control commands 270, such that the second microphone 240 can be turned on or off, and the volume level of the speaker 260 can be raised or lowered.

Figure 3B:
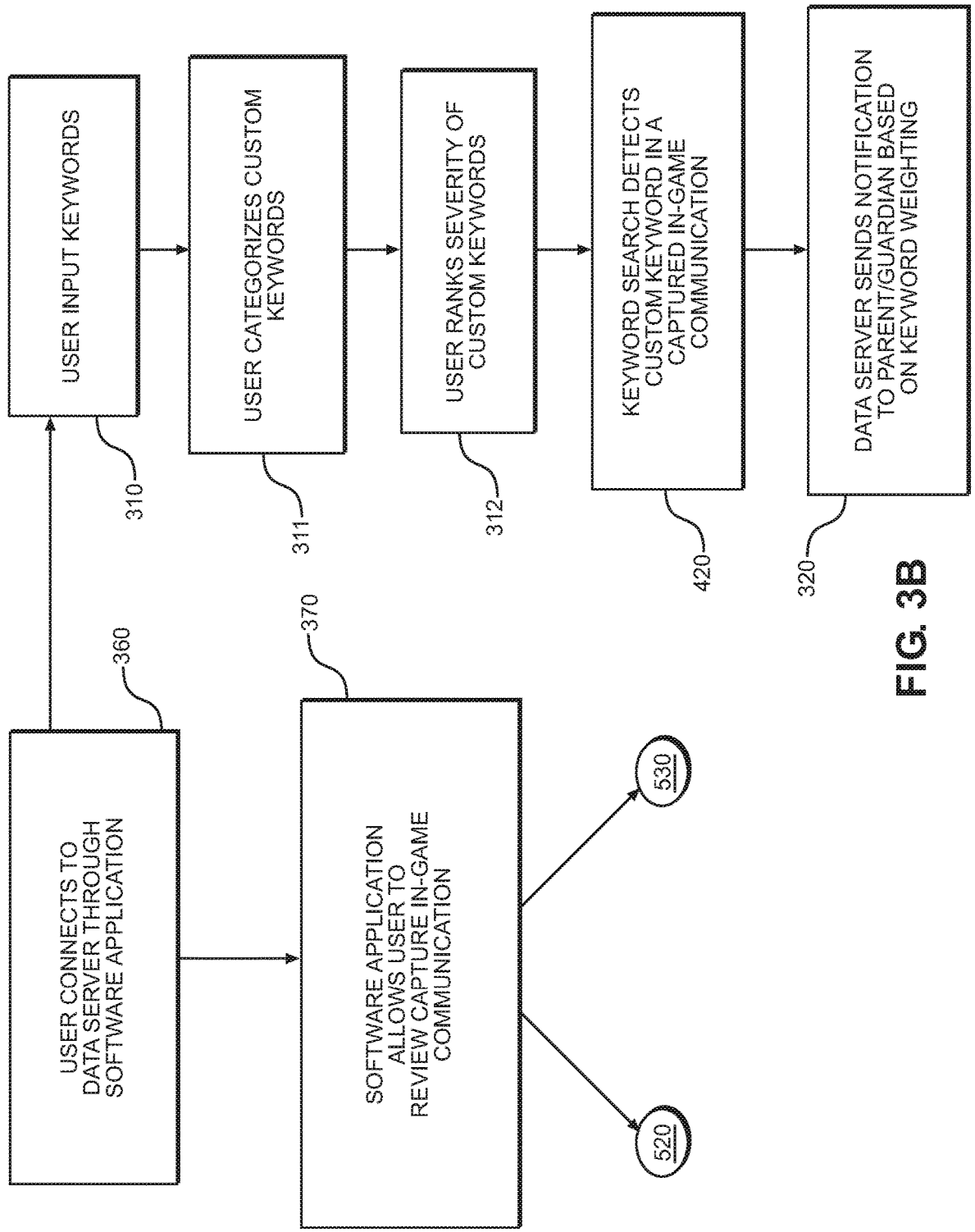
FIG. 3B shows a logical view of how a downloadable software application interfaces with a web-based data server in one embodiment of a system for monitoring online gaming activity.

Referring now to FIGS. 3A and 3B, there is shown a flow chart of how a downloadable software application interfaces with a web-based data server, a logical view of how a downloadable software application interfaces with a web-based data server in one embodiment of a system for monitoring online gaming activity, respectively. In the illustrated embodiment the downloadable software application 300 is further configured to detect the usage of special keywords 310 or phrases, via a keyword search 420 of the searchable text-based transcripts 530 of in-game oral communication between players stored on the web-based data server 400. In use, the downloadable software application 300 first creates a wireless interface 360 with the web-based data server 400. Once the interface 360 is established the parent or guardian can use the downloadable software application 300 to input special keywords 310 or phrases that they have personally defined. Next, the parent or guardian can use the downloadable software application 300 to classify the keywords 310 into a variety of categories in step 311. Examples of some possible categories are personal phone numbers, email addresses, drugs, sex, violence, curse words, etc. Once categorized the parent or guardian can then use the downloadable software application 300 to rank or weight the severity of the custom keyword 310 or phrase based on their personal preferences in step 312.

In this embodiment, after the special keywords 310 have been input, categorized 311, and ranked 312, the web-based data server then performs a keyword search 420 on searchable text-based transcripts 530. Then based on the results of that keyword search 420 the web-based data server 400 is further configured to send a notification 320 to the parent or guardian through the downloadable software application 300 when these keywords 310 or phrases are detected. Additionally, in step 312 the parent or guardian can define how they wish to be notified in step 320 upon detection of the keywords in step 420. For example, detection of low ranking keywords will only show up as an alert within the application 300, while detection of middle ranked keywords can trigger transmission of an automated text or email to the parent or guardian, and detection of the highest ranked keywords can trigger a phone call to the parent or guardian.

The downloadable software application 300 is further configured to facilitate review of both the recorded audio file 520 and the searchable text-based transcript 530 of the in-game oral communication 500 between players after the communication 500 has occurred.

Figure 4A:
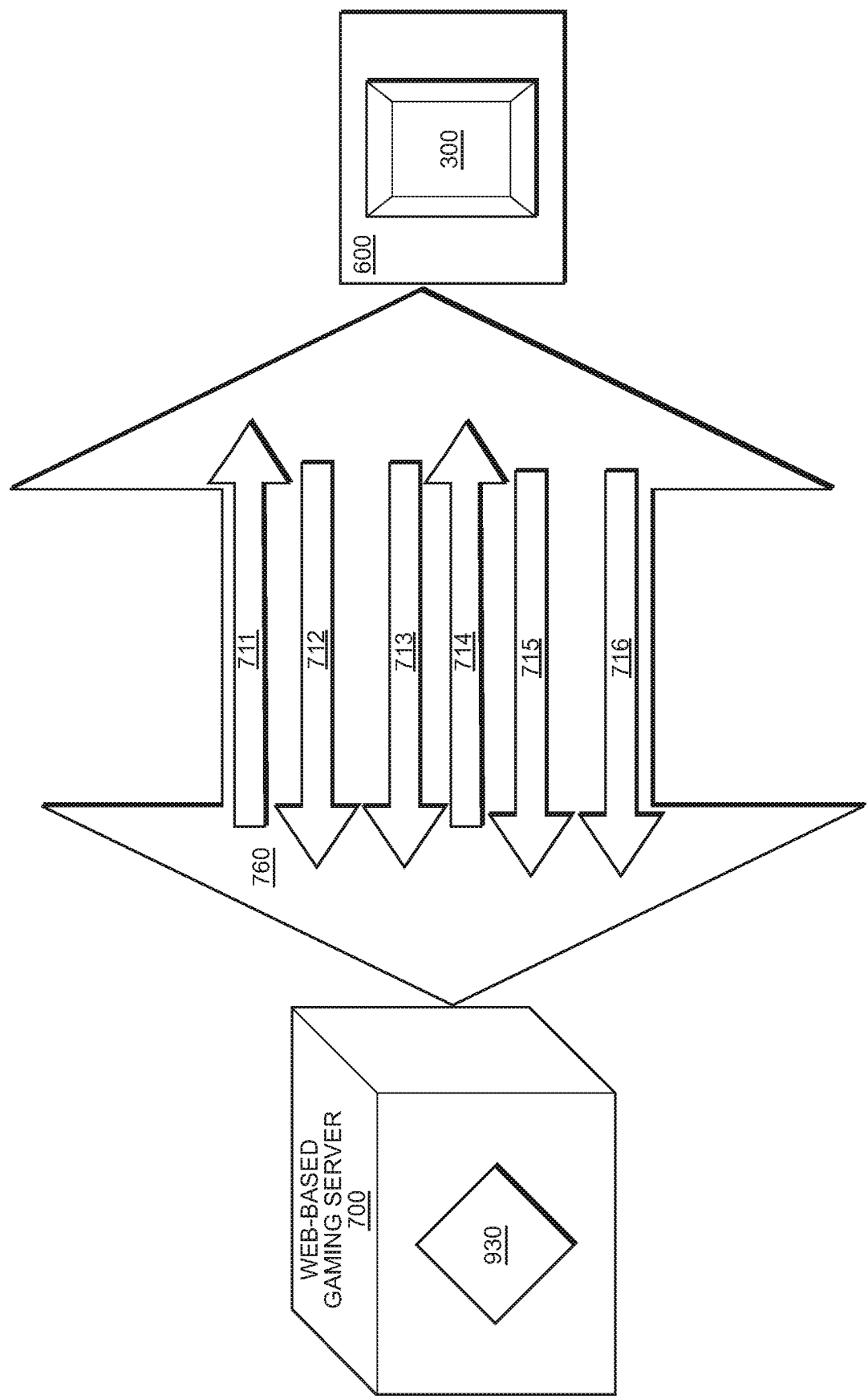
FIG. 4A shows a flow chart of how a downloadable software application interfaces with a web-based gaming server in one embodiment of a system for monitoring online gaming activity.
Figure 4B:
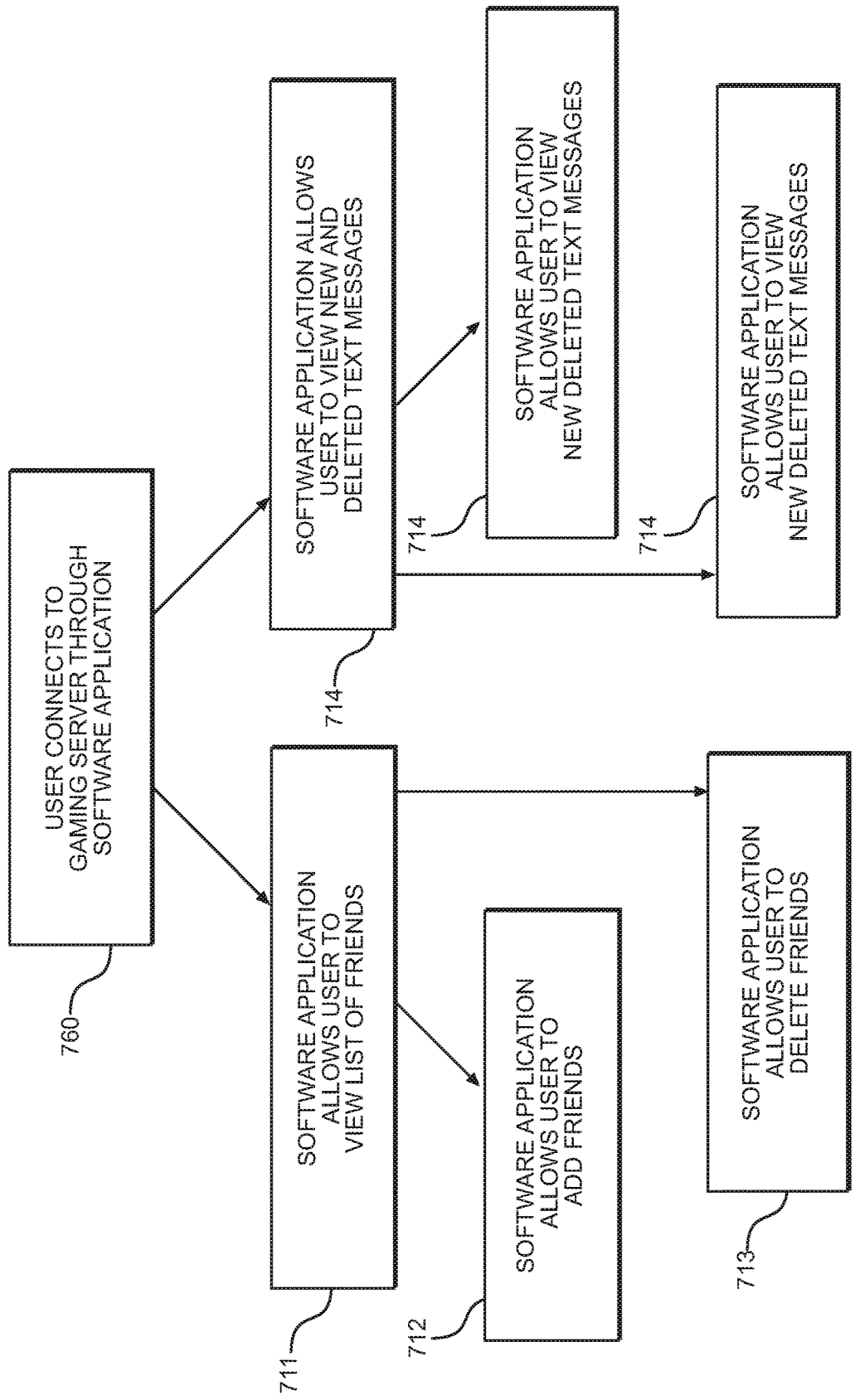
FIG. 4B shows a logical view of how a downloadable software application interfaces with a web-based gaming server in one embodiment of a system for monitoring online gaming activity.

Referring now to FIGS. 4A and 4B, there is shown a flow chart of how a downloadable software application interfaces with a web-based gaming server, and a logical view of how a downloadable software application interfaces with a web-based gaming server in one embodiment of a system for monitoring online gaming activity, respectively.

In one embodiment the downloadable software application 300 is further configured to synch with in-game user accounts 930, such that a parent or guardian can perform in-game social activities 710. In use, the downloadable software application 300 first wireless interface 760 with web-based gaming server 700. Then once the interface 760 is established the parent or guardian can use the downloadable software application 300 to perform in-game social activities 710 like: viewing a friend 711, adding 712 or deleting 713 friends, or viewing text messages 714, sending 715 or deleting 716 text messages.

Figure 5A:
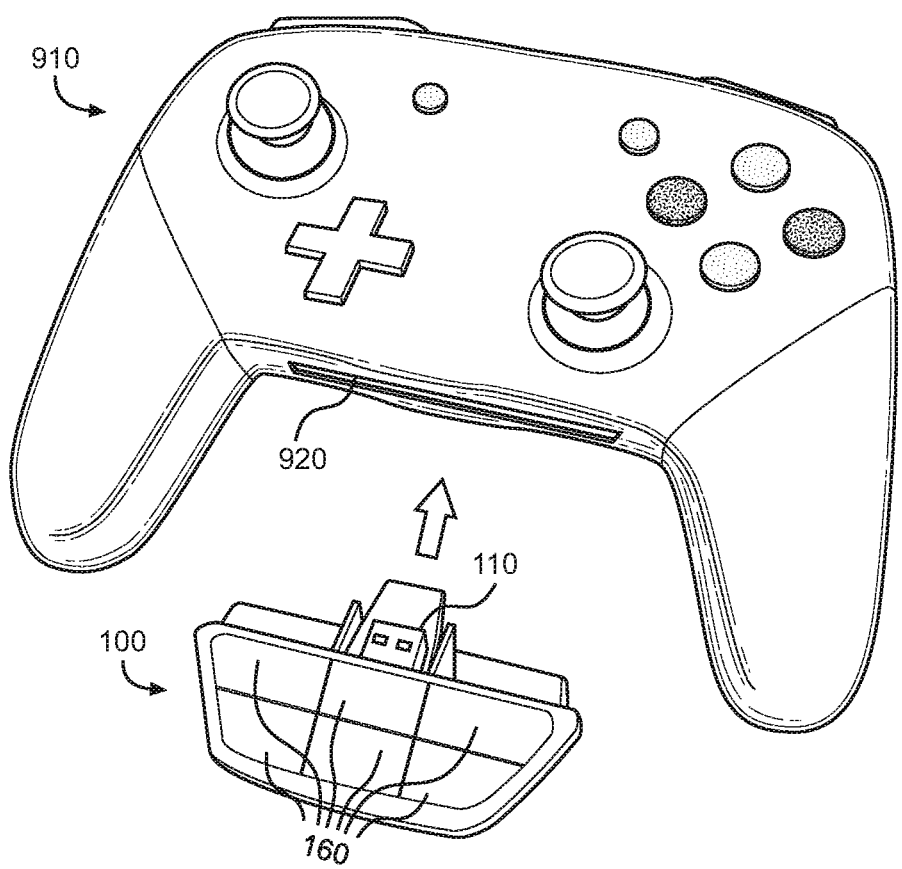
FIG. 5A shows a perspective view of a controller extension unit being inserted into a controller for a gaming console in one embodiment of a system for monitoring online gaming activity.

Referring now to FIG. 5A, there is shown a perspective views of a controller extension unit being inserted into a controller for a gaming console. In the illustrated embodiment the electronic connector 110 is disposed on the controller extension unit 100 is configured to be removably attached to an electronic port 920 on a controller 910 for a gaming console. Here the electronic port 920 that the electronic connector 110 is being inserted into, is an audio output port, such that audio data 510 from the other player participating in the in-game oral communication can be captured by the first microphone. In other embodiments the electronic port 920 is a first 3.5 mm audio jack disposed on controller 910 for a gaming console 900. In such embodiments the controller extension unit 100 can further include a second audio output port configured to facilitate wired connection of an additional audio output device through the controller extension unit 100 and thereby expand the utility of the device.

Figure 5B:
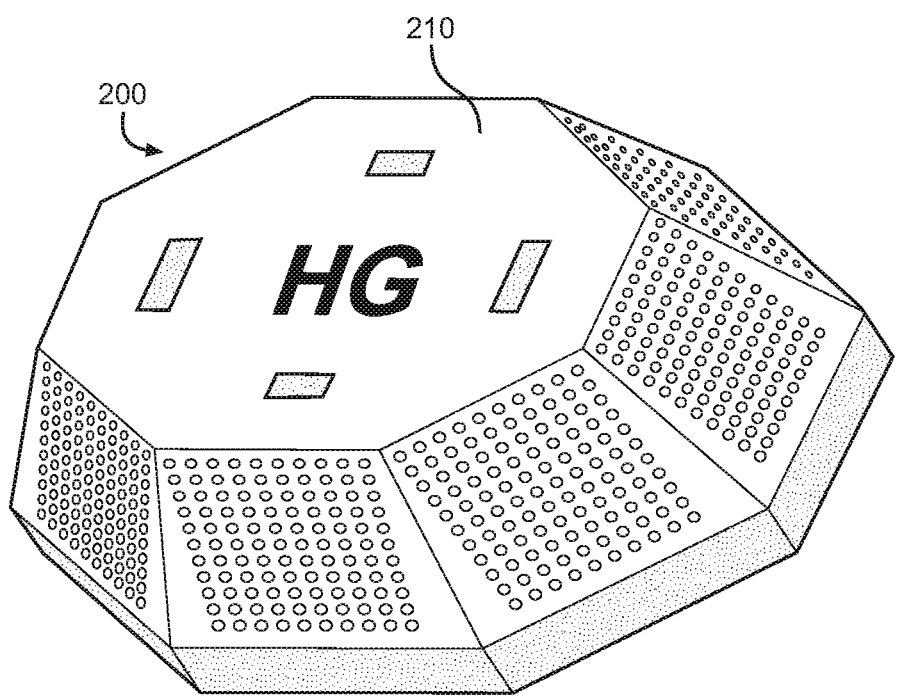
FIG. 5B shows a perspective view of a listening device in one embodiment of a system for monitoring online gaming activity.

Referring now to FIG. 5B, there is shown a listening device in one embodiment of a system for monitoring online gaming activity. In the illustrated embodiment the listening device 200 is configured to remotely monitor in-game oral communication up to the 30 feet away from the controller extension unit, to stream audio data of in-game oral communication between players, via the second transceiver, in real-time, and to allow a parent or guardian to actively participate the in game oral communication between players G while remotely monitoring from another room in the house.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention.

We claim:

1. A system for monitoring online gaming activities, comprising:
   a controller extension unit including an electronic connector, a first power supply, a first transceiver, a first microphone, and a first microprocessor;
   wherein the electronic connector is configured to be removably attached to electronic port on a controller for a gaming console;
   wherein the first microphone is configured to capture audio data from in-game oral communication between participants;
   wherein the first microprocessor is configured to record the audio data;
   wherein the first transceiver is configured to transmit the audio data to a data server;
   wherein the data server is configured to store the audio data as an audio file, and to convert the audio file into a searchable text-based transcript of the in-game oral communication between the participants;
   a listening device includes a speaker configured to play the in-game oral communication between the participants; and
   a downloadable software application configured to allow parents or guardians to receive modifications from and to interface with the data server housing audio recordings and searchable text-based transcripts of the in-game oral communication between players.

2. The system according to claim 1, wherein the listening device comprises a portable housing with a second power supply, a second transceiver, a second microphone, a second microprocessor, and a speaker disposed therein.

3. The system according to claim 1, wherein the controller extension unit further includes a plurality of buttons configured to transmit control commands wirelessly, via the first transceiver, to the second microphone and speaker disposed on the listening device.

4. The system according to claim 1, wherein the second microprocessor on the listening device is configured to implement control commands received via the second transceiver from the plurality of buttons disposed on the controller extension unit, such that the second microphone can be turned on or off, and the volume level of the speaker can be raised or lowered.

5. The system according to claim 1, wherein the electronic connector disposed on the controller extension unit configured to be inserted into an audio output port on a controller for a gaming console, such that audio data from the other player participating in the in-game oral communication can be captured by the first microphone.

6. The system according to claim 5, wherein the electronic connector disposed on the controller extension unit is a first 3.5 mm audio jack.

7. The system according to claim 5, wherein the controller extension unit further includes a second 3.5 mm audio jack configured to facilitate wired connection of an audio output device through the controller extension unit.

8. The system according to claim 1, wherein the first microprocessor is configured to continuously record captured audio data and the first transceiver is configured to continuously transmit captured audio data to the data server during gameplay.

9. The system according to claim 1, wherein the audio data captured includes only the in-game oral communication and does not include audio data of sound effects from game play.

10. The system according to claim 1, wherein the listening device is configured to remotely monitor in-game oral communication up to the 30 feet away from the controller extension unit.

11. The system according to claim 1, therein the speaker on the listening device is configured to stream audio of in-game oral communication between players, via the second transceiver, real-time.

12. The system according to claim 1, wherein the second microphone of the listening device is configured to allow a parent or guardian to actively participate in the in game-oral communication between players.

13. The system according to claim 1, wherein the data server employs a speech recognition software to convert the audio file into a searchable text-based transcript.

14. The system according to claim 13, wherein the speech recognition software is configured to only recognize words spoken in English.

15. The system according to claim 1, wherein the downloadable software application is further configured to facilitate review of both the recorded audio file and the searchable text-based transcript of the in-game oral communication between players after the communication has occurred.

16. The system according to claim 1, wherein the downloadable software application is further configured to detect the usage of special keywords or phrases, via keyword search of the searchable text-based transcripts of in-game oral communication between players stored on the data server.

17. The system according to claim 16, wherein the downloadable software application is further configured to allow the parent or guardian to rank the special keywords or phrases by severity, and to customize the notification given for each keyword or phrase.

18. The system according to claim 1, wherein the downloadable software application is further configured to synch with in-game user accounts, such that a parent or guardian can perform in-game social activities like: viewing a friend list, or viewing new and deleted text messages.

19. The system according to claim 1, wherein the first power supply of the controller extension unit and the second power supply of the listening device are wireless and rechargeable.

20. The system according to claim 1, wherein the second power supply of the listening device is wired.

* * * * *